Dec. 6, 1932.  C. H. BILLS ET AL  1,890,072
COOLING SYSTEM
Filed Feb. 17, 1931
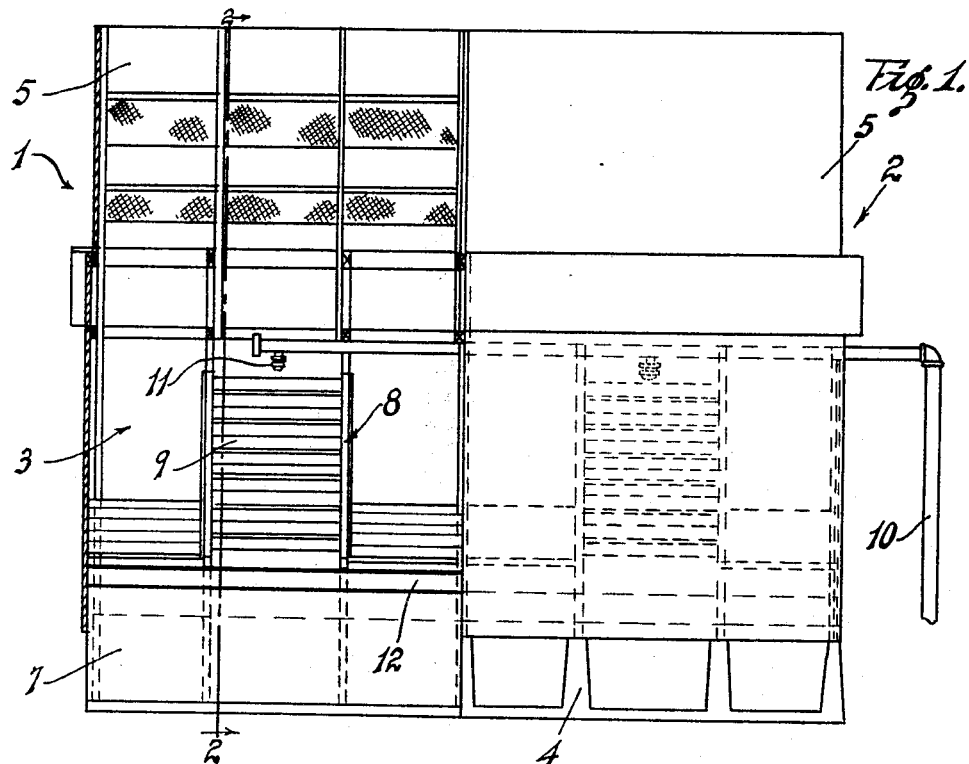
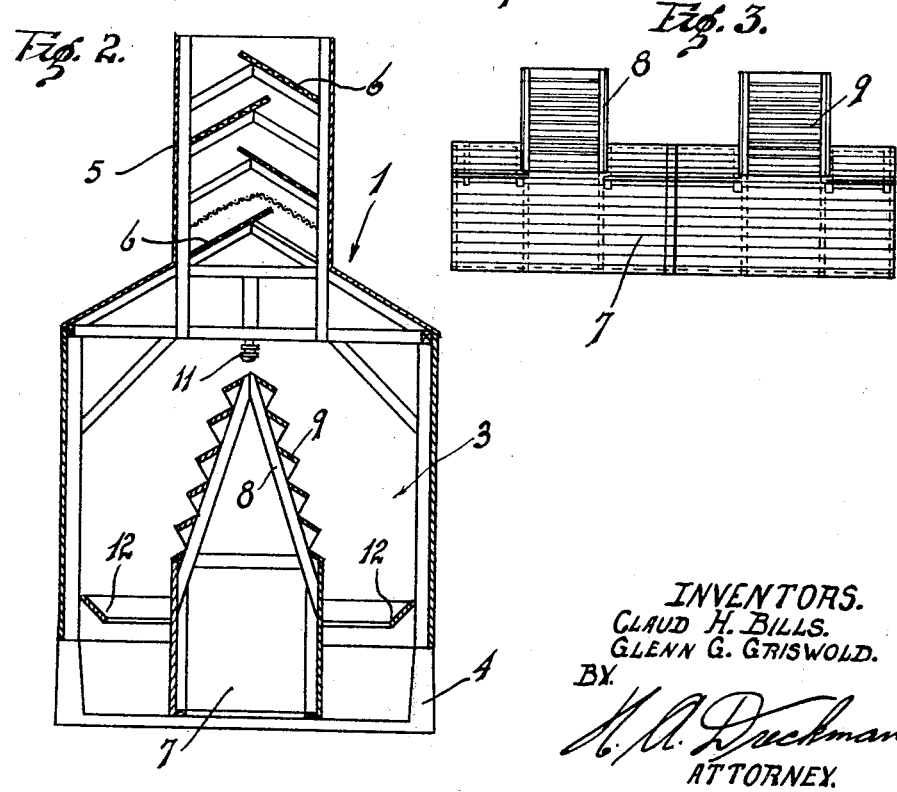
INVENTORS.
CLAUD H. BILLS.
GLENN G. GRISWOLD.
BY
*H. A. Druckman*
ATTORNEY.

Patented Dec. 6, 1932

1,890,072

UNITED STATES PATENT OFFICE

CLAUD H. BILLS AND GLENN G. GRISWOLD, OF LOS ANGELES, CALIFORNIA

COOLING SYSTEM

Application filed February 17, 1931. Serial No. 516,322.

This invention relates to a cooling tower particularly applicable for cooling water which is used in large stationary engines, in refineries for various purposes, and the like. In cooling towers heretofore in use the water was pumped to a considerable height and allowed to fall by gravity over inclined baffle plates, and air circulated around the baffle plates thus carrying off the heat in the water. The system just described, is very costly in that a considerable quantity of the water is carried away with the air which moves quite rapidly.

An object of our invention is to provide a cooling tower in which the loss of water is reduced to a minimum.

Another object is to provide a cooling tower of relatively small dimensions and therefore inexpensive to manufacture, and which effectively cool large volumes of water to a temperature corresponding to the temperature of the surrounding air.

Still another object is to provide a cooling tower which can be quickly and easily added to in order to increase capacity if desired.

Other objects, advantages, and features of invention may appear from the accompanying drawing, the subjoined detailed description, and the appended claims.

In the drawing

Figure 1 is a side elevation of our cooling tower, one portion of which has the side cover boards removed to show interior construction.

Figure 2 is a sectional view taken on line 2—2 of Figure 1.

Figure 3 is a side elevation of the air tunnel and air distributing towers.

Referring more particularly to the drawing, our cooling tower is preferably made in sections, 1—2, which sections are identical in construction and supplement each other so as to provide a cooling tower with the required capacity. In other words, a company may build one or two such sections and when necessary, additional sections can be added thereto by simply removing the end walls of the adjacent sections and placing such sections together. Only one of the units will be described in detail, in that the units are identical.

A rectangular cooling chamber 3 is formed by boarding up the sides and ends thereof. The chamber preferably rests upon concrete piers or foundations 4. A vent chamber 5 rises from the roof of the chamber 3, and within the vent chamber we provide a plurality of overlapping and transversely positioned screens 6. The space between the screens may also be filled with glass wool, or a similar material so that any water particles coming in contact with the screens or the material therebetween, is caused to condense and is returned into the chamber 3. However, the screens and the material therebetween must be sufficiently porous so as to enable a free passage of air therethrough.

Positioned entirely within the chamber 3, and extending longitudinally thereof, is an air tunnel 7 which may lead to a blower (not shown) to facilitate the cooling operation open at both ends so as to permit a free circulation of air therethrough. The sides of this tunnel are boarded up as shown in Figure 3, and rising therefrom is a vent 8. This vent is in the shape of a pyramidal tower, and the sides of the vent are covered with downwardly inclined louvers or baffles 9. These blades are spaced apart vertically so as to permit a free passage of air between adjacent pairs. The blades overlap slightly so that any water accumulation travels downwardly from one to the other and finds its way into the cold water sump (not shown) over which the cooling tower is placed. It will be evident from the foregoing description that no air can enter the tower except through the tunnel 7, and thence between the baffles or blades 9, and then out through the vent chamber 5.

The water to be cooled is pumped into the tower through a pipe 10 which extends horizontally into the chamber 3 adjacent the top thereof. Above each of the vent towers 8, we provide a spray head 11 of a construction similar to that disclosed in our co-pending application, Serial Number 422,060. The water is broken up into a fog or mist by the head, and the fine particles of water are more readily acted upon by the air to remove the heat therefrom. The upwardly moving column of air passes through the fog formed by the spray head or nozzle carrying the heat with it, and the cooled water accumulates in larger particles on the blades 9 and on the walls of the chamber 3.

A pair of trays 12—12 are positioned one on either side of the air tunnel 7, and these trays conduct the water into the sump which is provided below or adjacent to the tower in the usual and well known manner.

The efficiency of our tower is materially increased by the nozzles or heads 11 which break the water up into very minute particles, and these fine particles are then allowed to drop downwardly over a vent tower from which a constantly renewed spray of air passes. The entire tower being enclosed, is not affected by wind which carries the water away and dissipates the same resulting in material loss. The outlet from the tower is so protected by baffles or deflectors which accumulate the particles of water and return them into the tower, thus a relatively small amount of the water is carried out with the circulating air, and is lost.

Having described our invention, we claim:

1. A cooling tower comprising a housing, a vent chamber rising from the top of said housing, baffle means in said vent chamber, an air tunnel extending transversely through the housing, said tunnel being open at the ends thereof whereby air is supplied to the housing, a vent rising from the air tunnel and provided with louvers through which air is admitted into the housing, and a spray head in the housing above said vent through which the water to be cooled is forced.

2. A cooling tower comprising a housing, a vent chamber rising from the top of said housing, baffle means in said vent chamber, an air tunnel extending transversely through the housing, said tunnel being open at the ends thereof whereby air is supplied to the housing, a vent rising from the air tunnel and provided with louvers through which air is admitted into the housing, and a spray head in the housing above said vent through which the water to be cooled is forced, and trays on either side of said air tunnel and within the housing upon which the water is collected.

3. A cooling tower comprising an enclosed housing, a vent chamber rising from the top of the housing, a plurality of superposed screens in said vent chamber, an air tunnel extending transversely of the housing, said tunnel being open at both ends thereof, a pyramidal vent rising from the air tunnel, a plurality of superposed inclined baffles on the vent whereby water is deflected downwardly over the vent, and a spray head above the vent through which the water to be cooled is forced, and collecting trays on either side of said air tunnel upon which the cooled water is collected.

4. A cooling tower comprising an elongated housing, said housing being completely enclosed, a vent chamber rising from the housing, said vent chamber being open only at the top, a plurality of superposed screens in the vent chamber, an air tunnel extending through the housing longitudinally and centrally thereof, said air tunnel being open at both ends thereof, a pyramidal vent rising from the air tunnel, inclined baffles on the vent, a spray head above the vent through which the water to be cooled is forced, and trays on either side of said air tunnel on which the cooled water is collected.

In testimony whereof, we affix our signatures.

CLAUD H. BILLS.
GLENN G. GRISWOLD.